United States Patent
Frezza et al.

(10) Patent No.: US 12,460,678 B2
(45) Date of Patent: Nov. 4, 2025

(54) BEARING UNIT FOR ROTARY SHAFTS

(71) Applicant: AKTIEBOLAGET SKF, Gothenburg (SE)

(72) Inventors: Pasquale Frezza, Aversa (IT); Andrea A. Bertolini, Carrara (IT); Renato Berti, Massa (IT)

(73) Assignee: AKTIEBOLAGET SKF (SE)

( * ) Notice: Subject to any disclaimer, the term of this patent is extended or adjusted under 35 U.S.C. 154(b) by 88 days.

(21) Appl. No.: 18/515,383

(22) Filed: Nov. 21, 2023

(65) Prior Publication Data

US 2024/0255029 A1 Aug. 1, 2024

(30) Foreign Application Priority Data

Jan. 27, 2023 (IT) .......................... 102023000001266

(51) Int. Cl.
*F16C 33/78* (2006.01)
*F16C 33/58* (2006.01)

(52) U.S. Cl.
CPC ........ *F16C 33/7853* (2013.01); *F16C 33/583* (2013.01); *F16C 33/7823* (2013.01); *F16C 33/7826* (2013.01)

(58) Field of Classification Search
CPC .. F16C 33/583; F16C 33/586; F16C 33/7823; F16C 33/7853; F16C 33/7826; F16C 33/7876; F16J 15/3232
See application file for complete search history.

(56) References Cited

U.S. PATENT DOCUMENTS

| | | | | |
|---|---|---|---|---|
| 2010/0327539 | A1* | 12/2010 | Okaji ................. | F16C 33/7843 277/572 |
| 2012/0170884 | A1* | 7/2012 | Scott .................. | F16C 33/7826 277/565 |
| 2021/0140484 | A1* | 5/2021 | Kim .................... | B60B 27/0073 |

FOREIGN PATENT DOCUMENTS

| | | | | |
|---|---|---|---|---|
| CA | 2179554 A1 | * | 12/1996 | ......... F16C 33/7853 |
| CN | 101265949 | | 9/2008 | |
| FR | 2249573 | | 5/1975 | |
| FR | 2249573 A | * | 5/1975 | |
| JP | 2003262230 A | * | 9/2003 | ............ F16C 33/782 |
| WO | 2010136058 | | 12/2010 | |

OTHER PUBLICATIONS

International Search Report for corresponding Italy Application No. 102023000001266 dated Sep. 5, 2023.

* cited by examiner

*Primary Examiner* — Alan B Waits
(74) *Attorney, Agent, or Firm* — Reed Smith LLP

(57) ABSTRACT

A bearing unit includes a radially outer ring, a radially inner ring, and a sealing device. The inner ring includes a first radially outer surface formed, a second radially outer surface adjacent to the first, and a radial step connecting the radially outer surfaces. The sealing device includes a shaped shield mounted on the outer ring and an elastomer lining the shaped shield. The elastomer lining includes at least three radial contacting lips. A first, axially outer most radial contacting lip is in sliding contact with the first radially outer surface of the inner ring, a second, axially inner most radial contacting lip is in sliding contact with the second radially outer surface of the inner ring, and a third radial contacting lip positioned between the first and second radial contacting lips and in sliding contact with the second radially outer surface of the inner ring.

10 Claims, 4 Drawing Sheets

BEARING UNIT FOR ROTARY SHAFTS

CROSS-REFERENCE TO RELATED APPLICATION

This application is based on and claims priority to Italian Patent Application No. 102023000001266, filed on Jan. 17, 2023, under 35 U.S.C. § 119, the disclosure of which is incorporated by reference herein.

FIELD

The present disclosure relates generally to bearing units and in particular to bearing units for supporting one end of a rotary shaft.

SUMMARY

Exemplary embodiments described herein have innovative features, no single one of which is indispensable or solely responsible for their desirable attributes. Without limiting the scope of the claims, some of the advantageous features will now be summarized.

According to at least one non-limiting exemplary embodiments, a bearing unit may include a radially outer ring and a radially inner ring center about a central axis (X) of the bearing unit. The radially inner ring may include a first radially outer surface formed at an axially outer end of the radially inner ring, a second radially outer surface more radially inward than the first radially outer surface and the second radially outer surface being adjacent to the first radially outer surface, and a radial step having a radial length (a) connecting the first radially outer surface and the second radially outer surface. The bearing unit may further include a sealing device arranged between the radially outer ring and the radially inner ring. The sealing device may include a shaped shield mounted on the radially outer ring and an elastomer lining applied to an axially inner surface of the shaped shield and supported by the shaped shield. The elastomer lining may include at least three radial contacting lips, including a first, axially outer most radial contacting lip in sliding contact with the first radially outer surface of the radially inner ring, a second, axially inner most radial contacting lip in sliding contact with the second radially outer surface of the radially inner ring, and a third radial contacting lip positioned between the first and second radial contacting lips and in sliding contact with the second radially outer surface of the radially inner ring.

According to at least one non-limiting exemplary embodiment, the bearing unit may further include a first radial interference between the first radial contacting lip and the first radially outer surface of the radially inner ring, wherein the first radial interference is less than a second radial interference between each of the second and third radial contacting lips and the second radially outer surface of the radially inner ring.

According to at least one non-limiting exemplary embodiment, the first radial interference may be smaller than the second radial interference by the radial length (a) of the step of the radially inner ring.

According to at least one non-limiting exemplary embodiment, the first radial interference may be defined between a contact surface of the first radial contacting lip located at a distal end of the first radial contacting lip.

According to at least one non-limiting exemplary embodiment, the second radial interference may be defined between a respective contact surface of the second and third contacting lips, each contact surface located at a respective distal end of the second and third contacting lips.

According to at least one non-limiting exemplary embodiment, the contact surface of the first radial contacting lip may have an area that is smaller than an area of each contact surface of the second and third radial contacting lips.

According to at least one non-limiting exemplary embodiment, the radial length (a) of the step of the radially inner ring may be between 0.5 mm and 0.85 mm.

According to at least one non-limiting exemplary embodiment, the first radial interference may be greater than or equal to 0.5 mm.

According to at least one non-limiting exemplary embodiment, the first radially outer surface of the radially inner ring may have an axial width that is between 4 mm and 6 mm.

According to at least one non-limiting exemplary embodiment, the first radially outer surface of the radially inner ring comprises an axial length that may be between 4 mm and 6 mm.

According to at least one non-limiting exemplary embodiment, the shaped shield of the sealing device may include an outer folded edge that is received in a radially inner groove of outer ring to secure the sealing device to the radially outer ring.

BRIEF DESCRIPTION OF THE DRAWINGS

The disclosure is described below with reference to the attached drawings, which show some non-limiting exemplary embodiments of the disclosure, in which.

DETAILED DESCRIPTION

To support rotary shafts in industrial machinery, support assemblies for rotary shafts may include a cup-shaped flanged casing, i.e., a casing with a closed bottom, and a bearing unit provided with an outer ring, an inner ring, and a plurality of rolling bodies interposed between the inner ring and the outer ring. The outer ring may be stationary, while the inner ring may be rotatable, and specifically constrained to rotate with the rotary shaft.

On the side opposite the closed bottom of the casing, a sealing device may be seated between the outer ring and the inner ring to seal the interior of the bearing unit against external contaminants. The sealing device may be provided with a shaped metal shield interference fitted on the outer ring and lined with an elastomer lining. The elastomer lining may be provided with a pair of contacting lips that make sliding contact with the inner ring to create a seal against external contaminants.

However, such bearing units do not guarantee an effective seal, in particular when used in highly contaminated environments. Increasing the number of contacting sealing lips helps improve the seal of the sealing device, but it also increases the frictional resistance generated by the contacting sealing lips during use of the bearing unit. Such frictional resistance results in power loss and decreases the working life of the sealing lips and the surface of the bearing unit with which it contacts. Known solutions require customized consideration of specific applications, uses, and operating environments, which is costly and reduces a desirable level of standardization. Thus, a solution that achieves high sealing performance while minimizing frictional resistance is sought.

It is therefore an aim of the present disclosure to provide a bearing unit for supporting one end of a rotary shaft with a sealing device that does not have the drawbacks described above, i.e., with good sealing performance and low frictional resistance.

Figure 1:
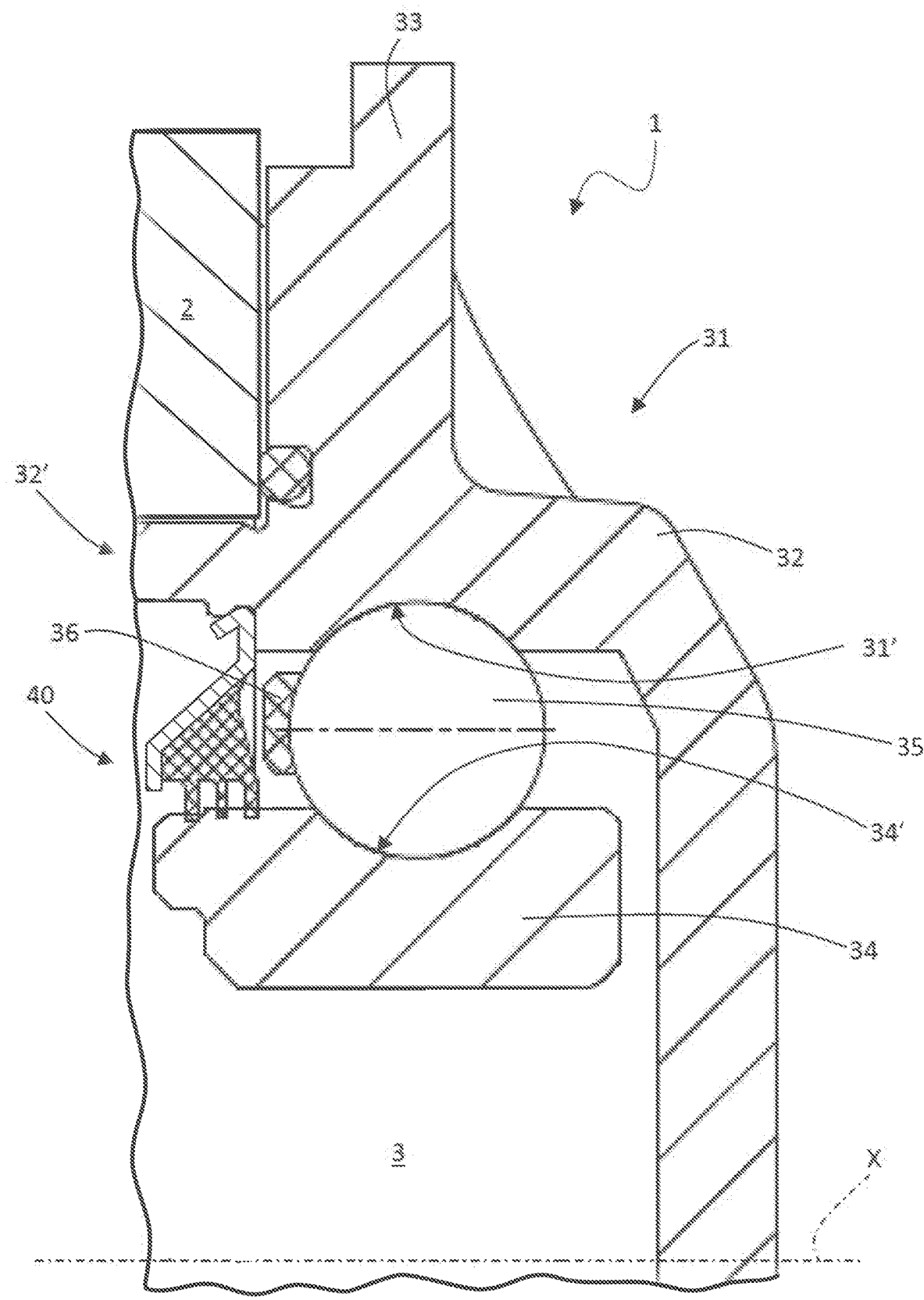
FIG. 1 shows a cross section of a bearing unit according to exemplary embodiments of the present disclosure.

With reference to the attached figures, a bearing unit 1 is described. As illustrated in FIG. 1, a bearing unit 1 may be interposed between a first mechanical element 2 and a second mechanical element 3 of a machine. In some embodiments, first mechanical element 2 may be a static frame 2 and second mechanical element 3 may be a rotary shaft 3.

Throughout the present description and in the claims, terms and expressions indicating positions and orientations, such as "radial" and "axial," are to be understood with reference to a central axis of rotation X of bearing unit 1.

In some embodiments, bearing unit 1 may include a radially outer ring 31 provided with a raceway 31' on a radially inner surface of radially outer ring 31, a radially inner ring 34 provided with a raceway 34' on a radially outer surface of radially inner ring 34, a plurality of rolling bodies 35 interposed between radially outer ring 31 and radially inner ring 34 to enable relative motion between the two rings, a cage 36 to contain each rolling body 35 of plurality of rolling bodies 35, and a sealing device 40 interposed between radially outer ring 31 and radially inner ring 34.

In some embodiments, radially outer ring 31 may also include a cup-shaped casing 32 having a first end that is closed at an axially inner end of radially outer ring 31 and a second end that is open to an axially outer end 32' of radially outer ring 31. In some embodiments, radially outer ring 31 may further include a flange 33 transverse to central axis X and rigidly connected to cup-shaped casing 32 at a first end and to static frame 2 at a second end. In some embodiments, sealing device 40 may be positioned at axially outer end 32' of radially outer ring 31.

Figure 2:
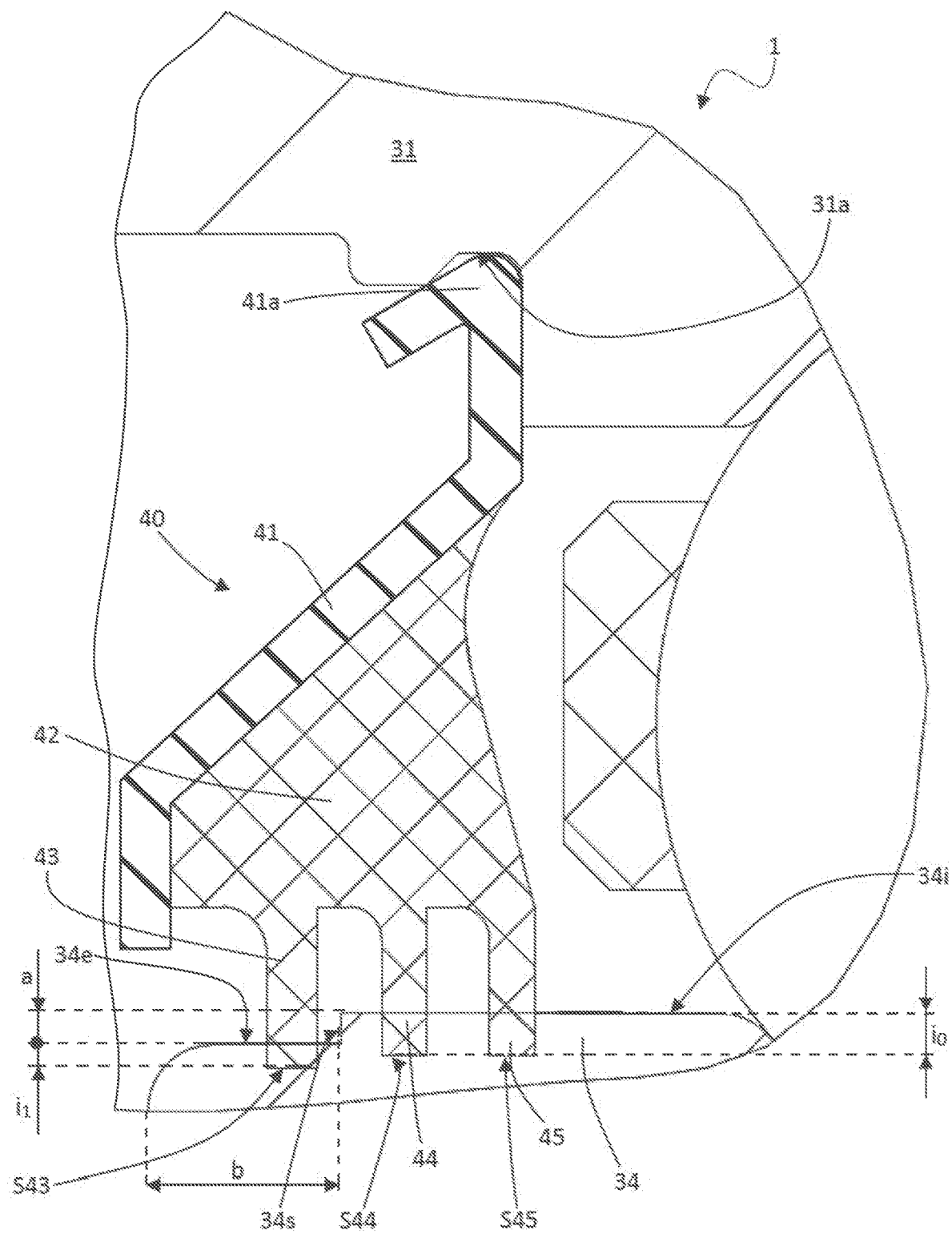
FIG. 2 shows an enlarged view of a sealing device of the bearing unit of FIG. 1 according to exemplary embodiments of the present disclosure.

FIG. 2 illustrates an enlarged view of sealing device 40. In some embodiments, sealing device 40 may include a shaped shield 41 and an elastomer lining 42 arranged on an axially inner facing surface of shaped shield 41. Shaped shield 41 may include an outer folded edge 41a that is received in a radially inner groove 31a of radially outer ring 31 to stably secure shaped shield 41 to radially outer ring 31. In some embodiments, elastomer lining 42 may include radial contacting lips 43, 44, and 45 configured to be in sliding contact with a first radially outer surface 34e of radially inner ring 34 and a second radially outer surface 34i of radially inner ring 34 that is adjacent to first radially outer surface 34e. In some embodiments, each radial contacting lip 43, 44, and 45 are of substantially equal radial lengths. Use of more than two contacting lips helps ensure excellent sealing performance.

In some embodiments, radial contacting lip 43 may be an axially outer most radial contacting lip that is configured to contact first radially outer surface 34e due to a radial interference $i_1$ between a radially inner surface S43 of lip 43 and first radially outer surface 34e. In some embodiments, radial contacting lip 45 may be an axially inner most contacting lip that is configured to contact second radially outer surface 34i due to a radial interference $i_0$ between a radially inner surface S45 of lip 45 and second radially outer surface 34i. In some embodiments, radial contacting lip 44 may be positioned axially between lip 43 and lip 45 and may be configured to contact second radially outer surface 34i due to radial interference $i_0$ between a radially inner surface S44 of lip 44 and second radially outer surface 34i. In some embodiments, radial interference $i_0$ is between 0.25 mm and 0.9 mm.

In some embodiments, radially inner ring 34 may include a step 34s connecting first radially outer surface 34s with second radially outer surface 34i such that first surface 34e is radially inner relative to second surface 34i by a radial length "a" of step 34s. As a result of step 34s, radial interference $i_1$ of axially outer most contacting lip 43 is less than radial interference $i_0$, particularly in embodiments where contacting lips 43, 44, and 45 are of equal or substantially equal lengths. In some embodiments, radial interference $i_1$ may be equal to radial interference $i_0$ plus radial length "a" of step 34s.

Step 34s may be formed by machining first radially outer surface 34e of radially inner ring 34 to create step 34s. By forming first radially outer surface 34e at an outer axial end of radially inner ring 34, the overall strength of inner ring 34 may remain substantially the same as compared to an inner ring with no step, as surface 34e is formed away from raceway 34', which is a stress zone of radially inner ring 34. Furthermore, by machining step 34s into radially inner ring 34, radially inner ring 34 may be made more lightweight by reducing the material of radially inner ring 34.

In addition, by introducing step 34s into radially inner ring 34, contacting lip 43, which contact first radially outer surface 34e of radially inner ring 34, may be deformed less than contacting lips 44 and 45, which contact second radially outer surface 34i of radially inner ring 34. This can be seen in FIG. 3, which shows an exemplary embodiment of contacting lips 43, 44, and 45 experiencing deformation during use of bearing unit 1. Lesser deformation results in a lower contact force exchanged between the contacting lips and radially inner ring 34, which results in less frictional resistance therebetween. Thus, in embodiments in which inner ring 34 includes a step 34s, axially outermost contacting lip 43 may have a lower contacting force with first radially outer contact surface 34e as compared to a contacting force between each of contacting lips 44 and 45 and second radially outer surface 34i of radially inner ring 34.

Figure 3:
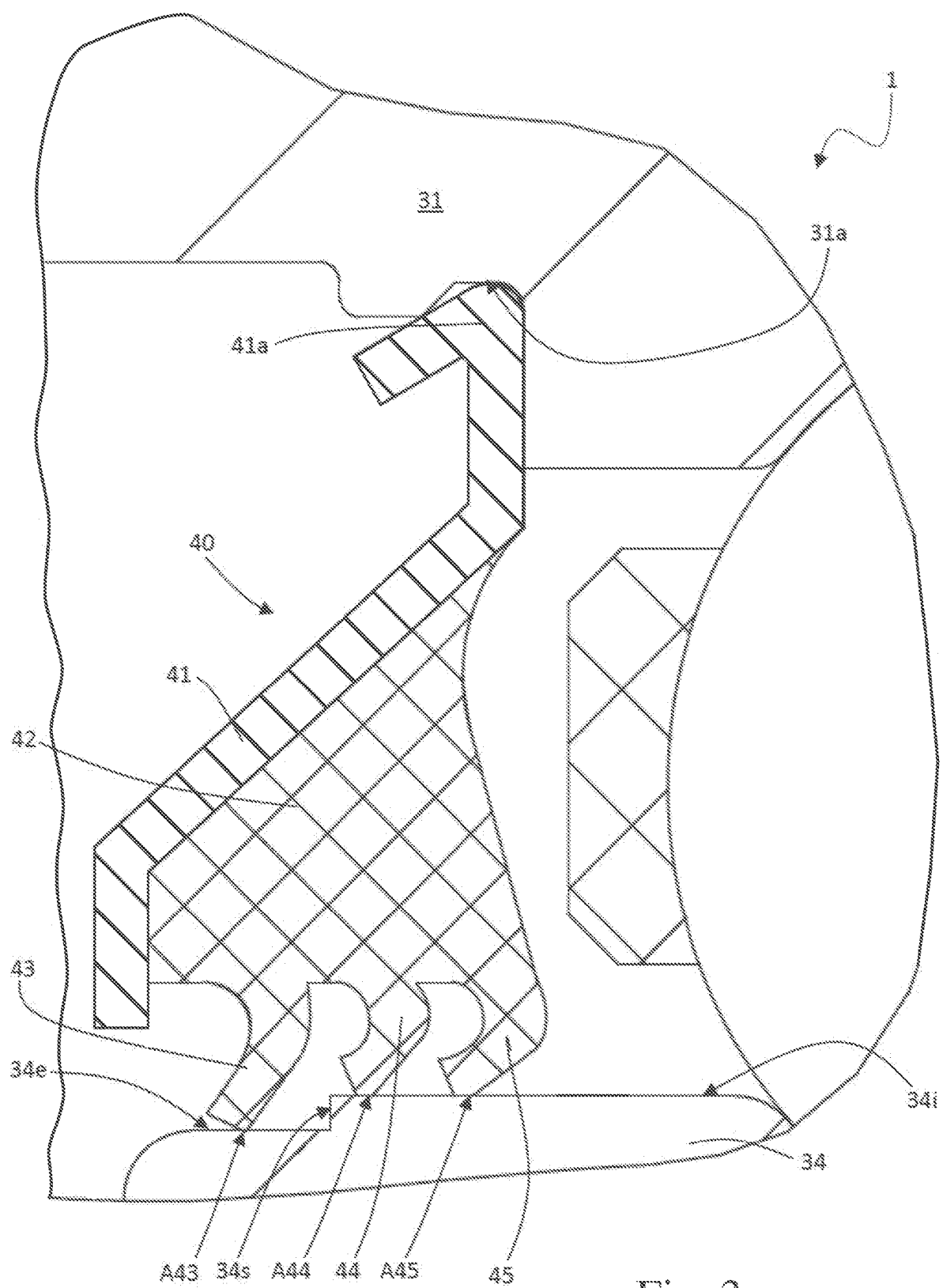
FIG. 3 shows an enlarged view of the sealing device of FIG. 2 in a deformed configuration according to exemplary embodiments of the present disclosure.

Further, lesser deformation of a radial contacting lip reduces a contact area between the radial contacting lip and radially inner ring 34. As illustrated in FIG. 3, axially outer most radial contacting lip 43 may contact first radially outer surface 34e of radially inner ring 34 with a contact area A43 and each of radial contacting lips 44 and 45 contact second radially outer surface 34i with a contact area of A44 and A45, respectively. Because contacting lip 43 is deformed less than contacting lip 44 and 45 by virtue of interference $i_0$ being less than interference $i_1$ by radial length a of step 34s, contact area A43 of contacting lip 43 is smaller than contacting areas A44 and A45 of radial contacting lips 44 and 45, respectively. This results in greater contact pressure to radial contacting lip 43 than to radial contacting lips 44 and 45, and therefore an increased sealing effect in radial contacting lip 43 than in radial contacting lips 44 and 45.

In some embodiments, the contact pressure contributed by axially outer most radial contacting lip 43 contacting first radially outer surface 34e of radially inner ring 34, which has a reduced radial extension compared to second radially outer surface 34i of inner ring 34, results in a negligible increase in the overall friction resistance of sealing device

40 while adding a non-negligible improvement to the overall sealing performance of sealing device 40.

Figure 4:
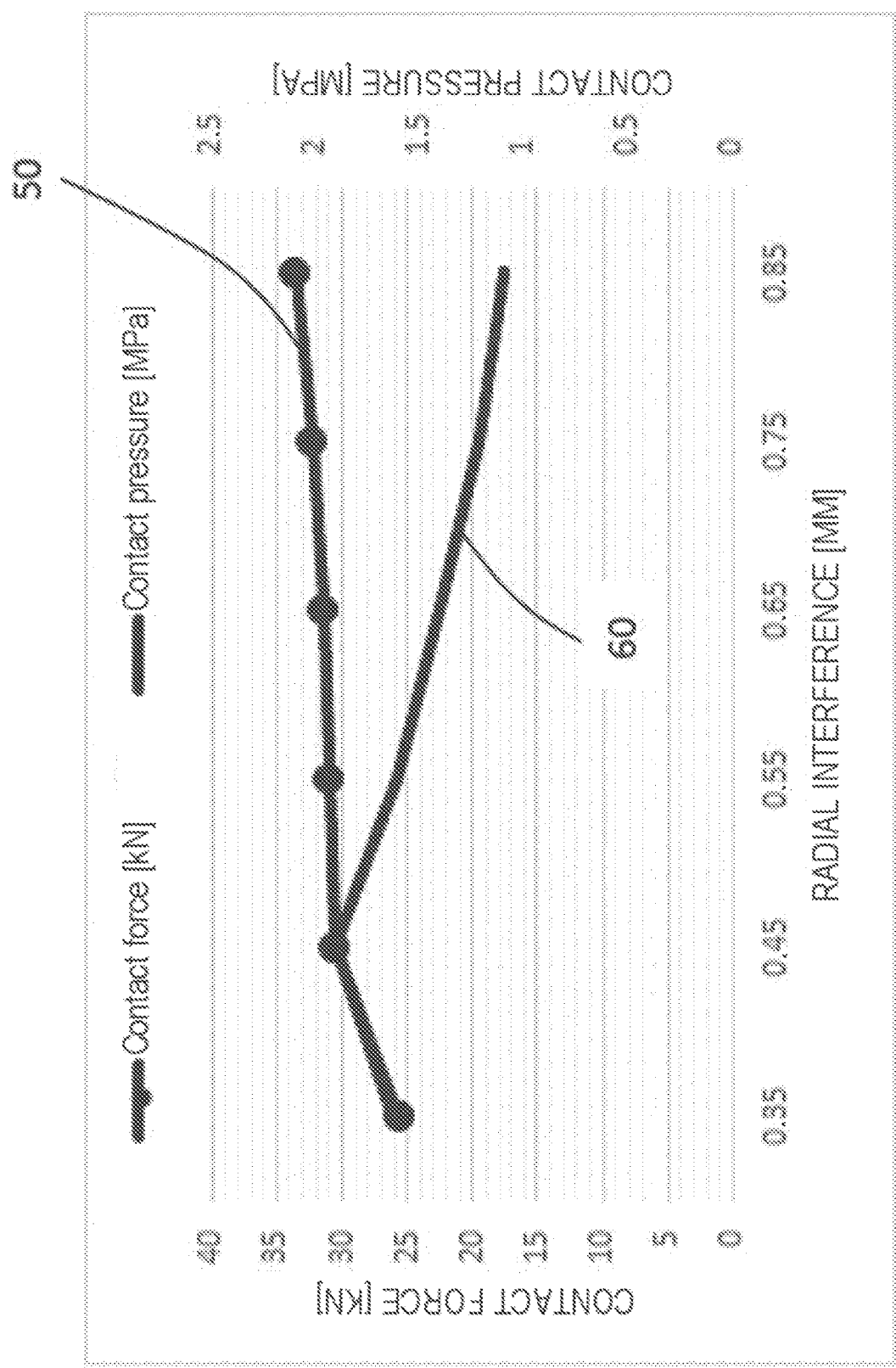
FIG. 4 shows a graph of contact forces and contact pressures of the sealing device of the bearing unit of FIG. 1.

FIG. 4 is a graph illustrating the results of a finite-element simulation of a sealing device in accordance with the preceding description. The X-axis of the graph shows the radial interference values in millimeters (mm) between a contacting lip, e.g., contacting lip 43, 44, 45, and a radially inner ring, e.g., radially inner ring 34. The first Y-axis on the left-hand side of the graph shows values 50 for a contact force (i.e., a frictional resistance), in units of kiloNewtons (kN), between a contacting lip and a radially inner ring at given radial interferences. The second Y-axis on the right-hand side of the graph shows values 60 for a contact pressure, in units of MegaPascals (MPa), between a contacting lip and a radially inner ring at given radial interferences.

As shown, the contact force 50 between the contacting lip and the inner ring decreases as the radial interference decreases, thereby reducing frictional resistance and power loss. Simultaneously, contact pressure 60 increases as radial interference decreases until an inflection point at an interference of approximately 0.45 mm, at which point the contact pressure begins to decrease as the radial interference decreases. This occurs because reducing the radial interference distends the contacting lip to a lesser degree, thereby reducing the contact area between the contacting lip and the inner ring, which increases the contact pressure and improves seal performance. For radial interference values below 0.45 mm, the contacting lip may be considered substantially distended such that the size of the contact surface remains substantially constant even as the radial interference decreases. Because the size of the contact surface remains substantially the same, the contact pressure 60 follows the trend of the contact force 50 and decreases as the radial interference decreases.

Consequently, combining axially outer radial contacting lip 43 with the two axially inner radial contacting lips 44, 45 improves the seal (i.e., a greater contact pressure) without excessively affecting frictional resistance (i.e., a lower contact force).

In some embodiments, radial interference $i_1$ may be no less than 0.5 mm. In some embodiments, a radial length "a" of step 34s may be between 0.5 mm and 0.85 mm. This particular range of radial interference values is particular advantageous because it falls on the graph in FIG. 4 at a point where the contact pressure increases as the radial interference decreases. Furthermore, this range of radial length "a" is particularly advantageous because it helps ensure that radial interference $i_1$ is no less than 0.5 mm given the dimensions of the larger bearing unit, e.g., bearing unit 1.

In some embodiments, an axial length of first radially outer surface 34e of inner ring 34 (i.e. the recessed surface of the radially inner ring) may advantageously be between 4 mm and 6 mm. Values below 4 mm risk step 34s interfering with the axially outer most radial contacting lip, e.g., radial contacting lip 43, while values greater than 6 mm risk step 34s interfering with the radial contacting lip immediately adjacent to the outer most radial contacting lip, e.g., contacting lip 44.

Thus, the solution described herein provides a sealing device with at least three radial contacting lips that provide an excellent sealing effect to prevent external contaminants from entering the interior of the bearing unit. The solution also reduces the friction force resulting from a sealing device according to known solutions, including those with two sealing lips and even those with three sealing lips, by introducing a step in the radially outer surface of the radially inner ring configured to reduce the radial interference between the axially outer most radial contacting lip and the radially inner ring. This produces low contact forces between the lowered surface of the inner ring and the axially outer most contacting lip while achieving a high contact pressure that effectively seals the interior of the bearing unit.

In addition to the embodiments described above, numerous other variants of the disclosure are possible. Such embodiments should be understood to be examples and do not limit the scope, applications or possible configurations of the disclosure. Indeed, although the description provided above enables the person skilled in the art to carry out the present disclosure at least according to one example configuration thereof, numerous variations of the components described could be used without thereby moving outside the scope of the disclosure, as defined in the attached claims, interpreted literally and/or according to their legal equivalents.

It should be noted that the use of particular terminology when describing certain features or embodiments of the disclosure should not be taken to imply that the terminology is being re-defined herein to be restricted to include any specific characteristics of the features or embodiments of the disclosure with which that terminology is associated. Terms and phrases used in this disclosure, and variations thereof, especially in the appended claims, unless otherwise expressly stated, should be construed as open-ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least"; the term "such as" should be interpreted as "such as, without limitation"; the term "includes" should be interpreted as "includes but is not limited to"; the term "example" is used to provide exemplary instances of the item in discussion, not an exhaustive or limiting list thereof, and should be interpreted as "example, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

The invention claimed is:

1. A bearing unit with a central axis (X), the bearing unit comprising:
   a radially outer ring;
   a radially inner ring comprising:
      a first radially outer surface formed at an axially outer end of the radially inner ring;
      a second radially outer surface more radially inward than the first radially outer surface, wherein the second radially outer surface is positioned adjacent to the first radially outer surface; and
      a radial step comprising a radial length (a) connecting the first radially outer surface and the second radially outer surface; and
   a sealing device arranged between the radially outer ring and the radially inner ring, the sealing device comprising:
      a shaped shield mounted on the radially outer ring; and
      an elastomer lining supported by the shaped shield and applied to an axially inner surface of the shaped shield, the elastomer lining comprising:
         at least three radial contacting lips comprising:
            a first, axially outer most radial contacting lip, wherein the first radial contacting lip is in sliding contact with the first radially outer surface of the radially inner ring;
            a second, axially inner most radial contacting lip, wherein the second radial contacting lip is in sliding contact with the second radially outer surface of the radially inner ring; and
            a third radial contacting lip positioned between the first and second radial contacting lips, wherein the third radial contacting is in sliding contact with the second radially outer surface of the radially inner ring.

2. The bearing unit of claim 1, further comprising:
   a first radial interference between the first radial contacting lip and the first radially outer surface of the radially inner ring, and
   a second radial interference between each of the second and third radial contacting lips and the second radially outer surface of the radially inner ring
   wherein the first radial interference is less than the second radial interference.

3. The bearing unit of claim 2, wherein the first radial interference is smaller than the second radial interference by the radial length (a) of the radial step of the radially inner ring.

4. The bearing unit of claim 3, wherein the radial length (a) of the radial step of the radially inner ring is between 0.5 mm and 0.85 mm.

5. The bearing unit of claim 4, wherein the first radial interference is greater than or equal to 0.5 mm.

6. The bearing unit of claim 2, wherein,
   the first radial interference is defined between a contact surface of the first radial contacting lip located at a distal end of the first radial contacting lip, and
   the second radial interference is defined between a respective contact surface of each of the second and third contacting lips, each contact surface located at a respective distal end of each of the second and third contacting lips.

7. The bearing unit of claim 6, wherein,
   each of the first, second, and third contact surfaces comprises an area, and
   the area of the contact surface of the first radial contacting lip is smaller than each of the areas of each contact surface of the second and third radial contacting lips.

8. The bearing unit of claim 1, wherein the first radially outer surface of the radially inner ring comprises an axial width that is between 4 mm and 6 mm.

9. The bearing unit of claim 8, wherein the first radially outer surface of the radially inner ring comprises an axial length that is between 4 mm and 6 mm.

10. The bearing unit of claim 1, wherein the shaped shield of the sealing device comprises an outer folded edge that is received in a radially inner groove of the outer ring.

* * * * *